April 13, 1937.  R. S. BROWN ET AL  2,077,093
CHUCKING MACHINE
Filed Aug. 29, 1934   10 Sheets-Sheet 1

INVENTORS
Robert S. Brown
Elwyn P. Smith
BY
Mitchell Bechtel
ATTORNEYS

April 13, 1937.  R. S. BROWN ET AL  2,077,093
CHUCKING MACHINE
Filed Aug. 29, 1934  10 Sheets-Sheet 2

Fig. 3.

INVENTORS
Robert S. Brown
Elwyn P. Smith
BY
Mitchell Berhert
ATTORNEYS

April 13, 1937.  R. S. BROWN ET AL  2,077,093
CHUCKING MACHINE
Filed Aug. 29, 1934  10 Sheets-Sheet 3

INVENTORS
Robert S. Brown
Elwyn P. Smith
BY
ATTORNEYS

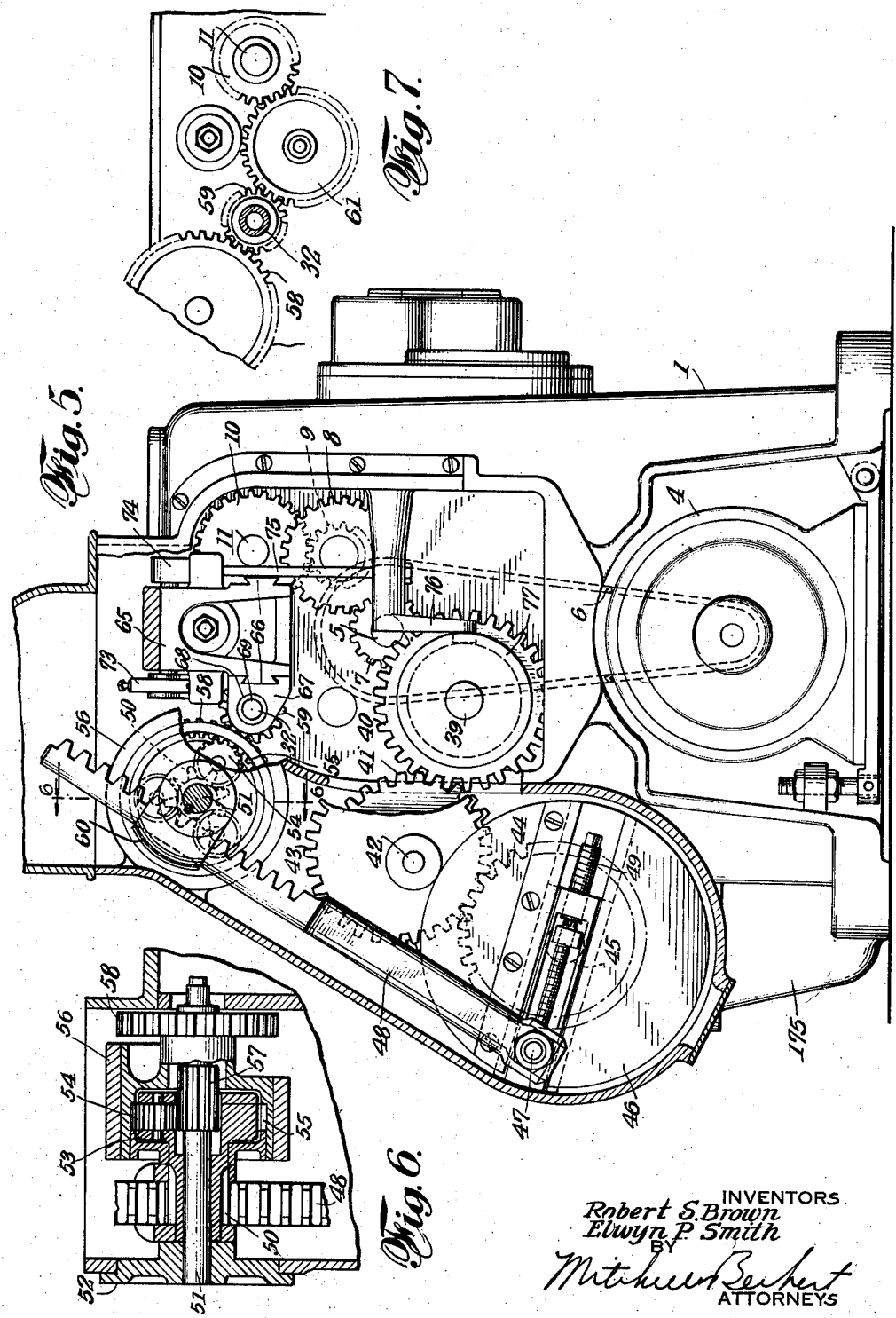

April 13, 1937.  R. S. BROWN ET AL  2,077,093
CHUCKING MACHINE
Filed Aug. 29, 1934   10 Sheets-Sheet 5

INVENTORS
Robert S. Brown
Elwyn P. Smith
BY
ATTORNEYS

April 13, 1937. R. S. BROWN ET AL 2,077,093
CHUCKING MACHINE
Filed Aug. 29, 1934 10 Sheets-Sheet 6

INVENTORS
Robert S. Brown
Elwyn P. Smith
BY
ATTORNEYS

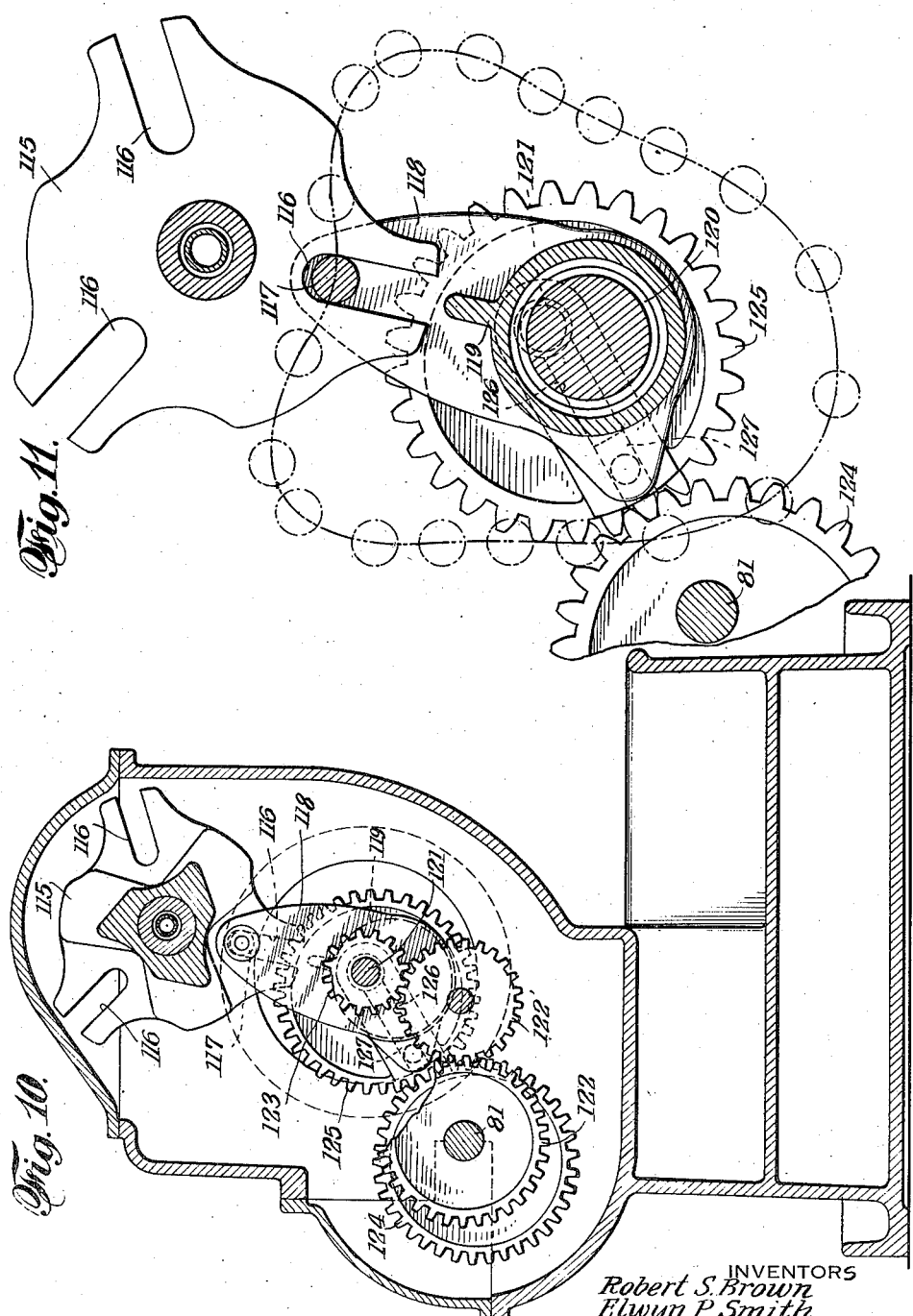

April 13, 1937.  R. S. BROWN ET AL  2,077,093
CHUCKING MACHINE
Filed Aug. 29, 1934   10 Sheets-Sheet 8
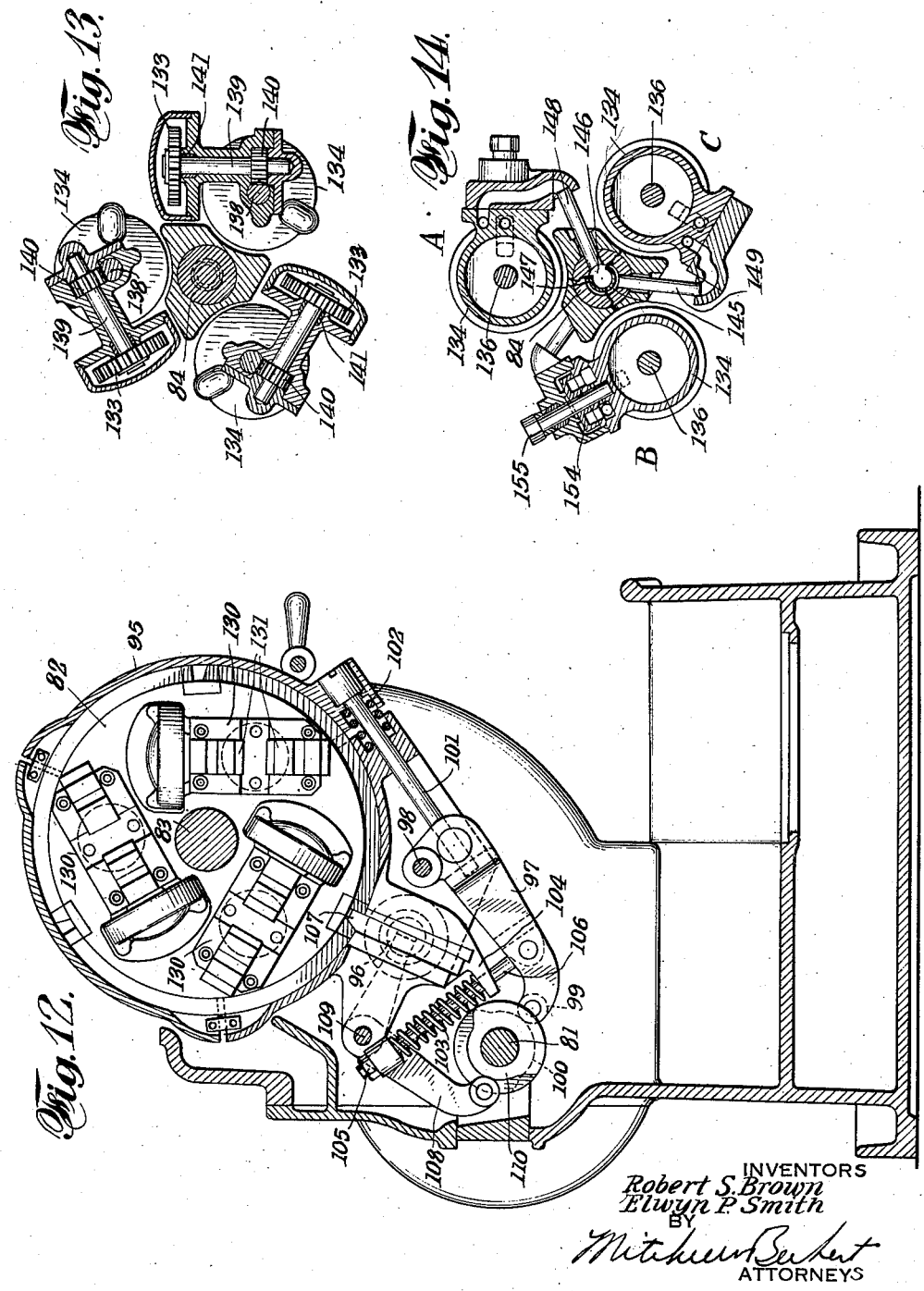
INVENTORS
Robert S. Brown
Elwyn P. Smith
BY
ATTORNEYS

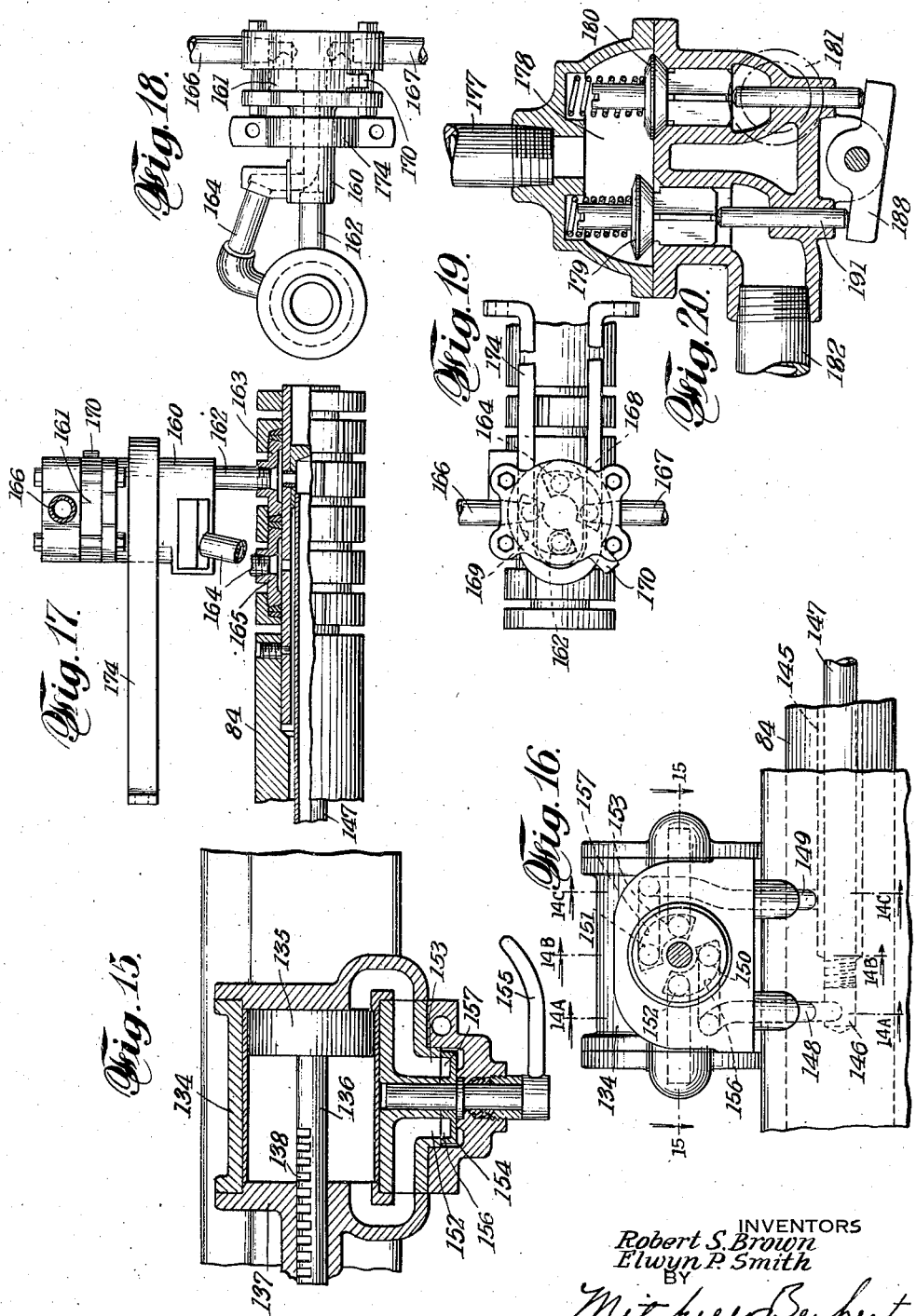

April 13, 1937.  R. S. BROWN ET AL  2,077,093
CHUCKING MACHINE
Filed Aug. 29, 1934  10 Sheets-Sheet 10
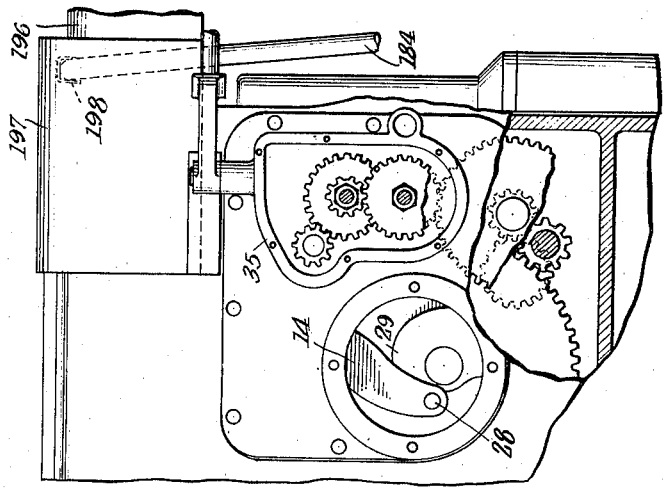
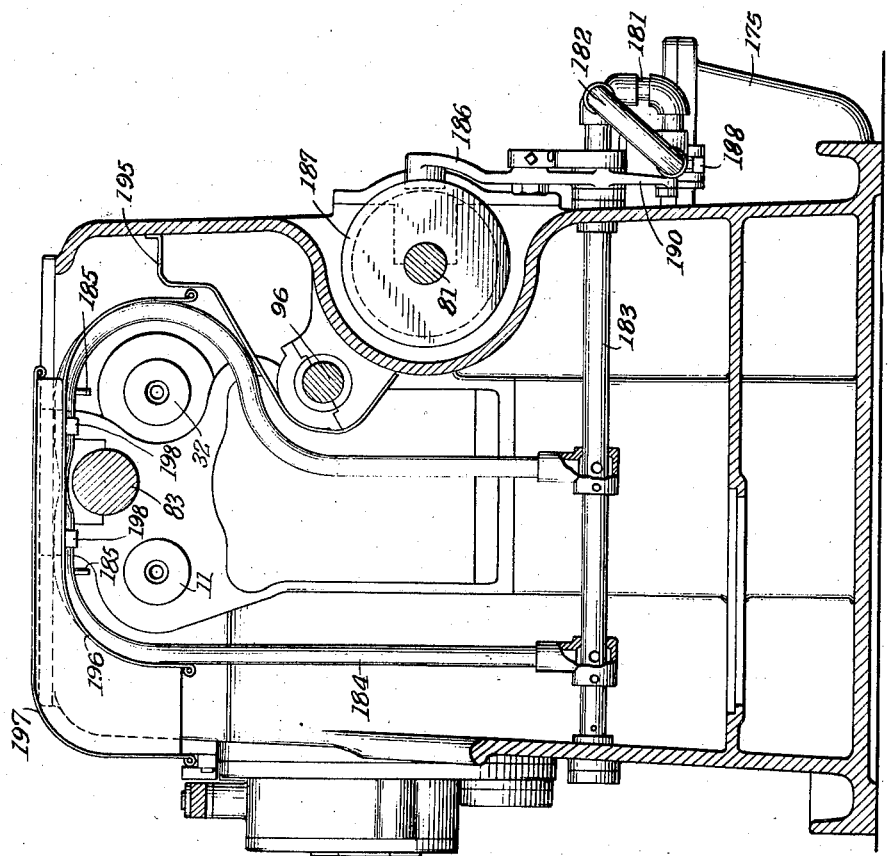
INVENTORS
Robert S. Brown
Elwyn P. Smith
BY
ATTORNEYS Patented Apr. 13, 1937

2,077,093

UNITED STATES PATENT OFFICE 2,077,093

CHUCKING MACHINE

Robert S. Brown, New Britain, and Elwyn P. Smith, Harwinton, Conn., assignors, by mesne assignments, to The New Britain Machine Company, New Britain, Conn., a corporation of Connecticut Application August 29, 1934, Serial No. 741,890

41 Claims. (Cl. 29—38)

Our invention relates to, and will be described as embodied in, a chucking machine, but it is to be understood that various features of the invention are applicable to machines of other types.

In general, it is the object of the invention to improve several features of a machine of the character indicated, with a view to an increase in speed and accuracy of the machine and to facilitating various changes usually made or desirable to be made in such machines.

It is a specific object to provide spindle feed mechanism providing for wide range of adjustment of feed with but few cams, and which always permits complete spindle retraction and avoids undue overhang.

It is another specific object to provide an improved threading mechanism, which mechanism, in addition to facilitating the accurate forming of threads, is readily changed over for cutting either right or left hand threads.

It is a further object to provide improved thread leader mechanism and means for jumping the threading tool to the work.

Another specific object is to provide improved indexing means particularly advantageous in connection with an indexible member having relatively few index positions and one having wide axial adjustment.

Another specific object is to provide an improved fluid pressure chucking mechanism without unduly increasing the length or weight of the indexible member.

Another object is to provide improved fluid pressure chucking mechanism in which leakage is reduced to a minimum and upkeep costs reduced.

Another object is to provide improved means for actuating fluid pressure actuated chucks so as to readily reverse the actuation thereof for gripping either the outside or the inside of a work piece.

Another specific object is to provide improved means for directing cutting oil or other coolant onto the work.

A further object is to provide improved means for preventing splash of the cutting oil or other coolant during operation of the machine and yet which provides for unobstructed operation of the machine.

Other objects and various features of novelty and invention will be either hereinafter pointed out or will become apparent to one skilled in the art upon a reading of the specification taken in connection with the drawings.

In said drawings which show, for illustrative purposes only, a preferred form of the invention as embodied in a two spindle chucking machine of the tool rotating type—

Fig. 3 is a front view of the left hand end of the machine shown in Fig. 1 up to the dot-dash line, the front wall being broken away and some parts shown in section and some parts omitted for the sake of illustration;

Fig. 5 is a sectional view taken substantially in the plane of the line 5—5 of Fig. 3;

Fig. 6 is a detail sectional view taken substantially in the plane of the line 6—6 of Fig. 5;

Fig. 7 is a detail view of a modified form of gearing for driving both spindles synchronously for threading;

Fig. 10 is a sectional view taken substantially in the plane of the line 10—10 of Fig. 4;

Fig. 11 is an enlarged detail sectional view taken substantially in the plane of the line 11—11 of Fig. 4;

Fig. 12 is a sectional view taken substantially in the plane of the line 12—12 of Fig. 4;

Fig. 13 is a sectional view of the chuck-cylinder group taken substantially in the plane of the line 13—13 of Fig. 4;

Fig. 14 is a composite sectional view of a cylinder and associated parts taken substantially in the planes of the lines 14ª, 14ᵇ and 14ᶜ of Fig. 16 and illustrating the chucking cylinder connections at the three section planes noted;

Fig. 15 is an enlarged sectional view of a cylinder and piston device for actuating a chuck, taken substantially in the plane of the line 15—15 of Fig. 16;

Fig. 16 is a view in elevation of a chuck cylinder illustrating valve passages and fluid pressure inlet and outlet ducts, etc.;

Fig. 17 is an enlarged top plan view in partial section of the turret stem or bar and illustrates a fluid distributor and various ducts and passages to the chucking cylinders;

Fig. 18 is an end view of the parts shown in Fig. 17 as viewed from the right;

Fig. 19 is a rear side view of the parts shown in Fig. 17;

Fig. 20 is a sectional view of a coolant diversion valve shown in place in Figs. 2 and 21;

Fig. 21 is a sectional view taken substantially in the plane of the line 21—21 of Fig. 3;

Fig. 22 is a fragmentary view in side elevation of a coolant pipe and housing parts shown in Fig. 21, certain cover caps being removed to illustrate gearing, and parts being shown in section.

Figure 1:
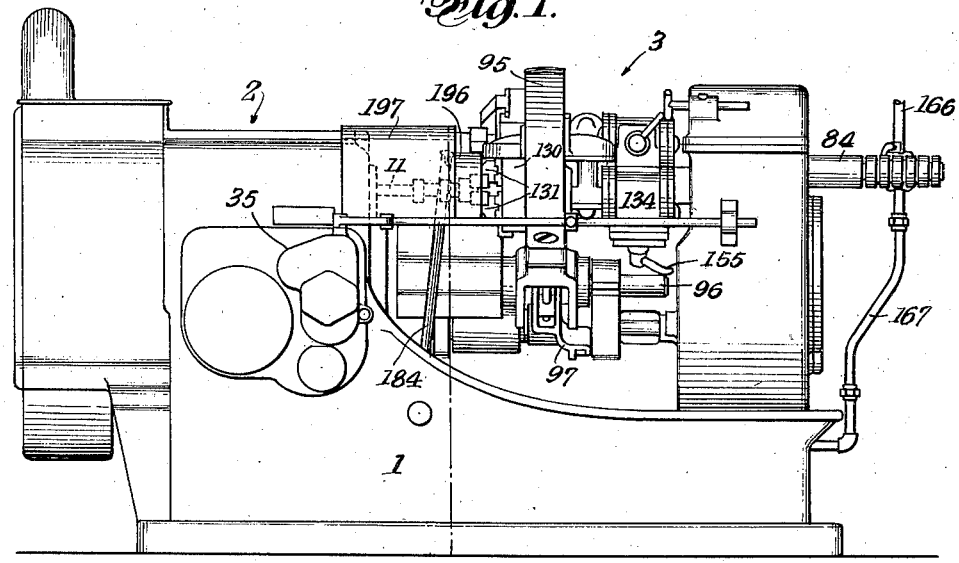
Fig. 1 is a view in front elevation of a machine embodying features of the invention.

Briefly stated, in the preferred form of the invention illustrated, the machine may consist of a frame 1 comprising a spindle end 2 and a turret end 3. The machine illustrated has two rotating spindles and an indexible turret having three chucks indexible successively from loading station into work stations in opposition to the rotating tool spindles. One or both of the spindles may be arranged for machining, drilling, reaming, etc., and one or both of the spindles may be arranged for threading. Rotation of the threading spindle is preferably accomplished by a rack and pinion device to be more fully described. An improved thread leader mechanism is preferably employed for jumping the threading tool to and from the work and for leading the threading tool. The spindle or spindles, when not employed for threading, may be fed by an improved spindle shift lever preferably arranged to variously adjust the stroke when employing the same cam.

The chucks are preferably fluid pressure actuated and various improvements are embodied in a fluid pressure actuating mechanism which tend to reduce leakage, facilitate inspection and repair, and generally shorten and lighten the indexible mass movable with the turret. The turret is adjustable toward and from the tools and the turret locking and clamping mechanism moves with the turret. The turret, with its indexing parts, is indexed in all axially adjusted positions by a modified Geneva motion so arranged as to cut down the normal speed of index when the index roll is or would be normally nearest the turret axis.

A coolant is directed on the work by improved means, rendering it possible to substantially completely house the work so as to avoid spatter of coolant. The housing mechanism and coolant directing mechanism are preferably movable together so as to house the work and direct coolant and so as to stop the flow of coolant and withdraw the housing so as to permit proper indexing, inspection, etc. Various features, as above noted, and others to be hereinafter described, need not all be employed in the same machine and may be advantageously employed in machines of other types, for example, machines in which the turret feeds up to the tools, and in machines in which the chucks rotate and the tools may be stationary.

The motive power for the machine is preferably a motor 4 housed in the base of the frame 1 and driving the shaft 5 as by means of a chain 6. The shaft 5 (Figs. 3 and 5) carries a spur gear 7 which meshes with a gear 8. Carried with the gear 8 is a gear 9 which in turn meshes with the spindle drive gear 10 shown also and more in detail in Fig. 9. Two or more of the gears mentioned are change gears to provide for various spindle speeds.

The spindle 11, driven by the gear 10, is mounted in a front bearing in the frame, while at the rear the spindle is carried by a sleeve 12 splined thereto, which sleeve has the drive gear 10 keyed thereon. The sleeve is mounted in an anti-friction bearing 13 as shown more particularly in Fig. 9. Thus, the spindle may be rotated at the required speed, and due to its splined connection with the sleeve 12, may be fed and retracted by suitable means such as the improved shift lever to be described. The front spindle bearing may be substantially the same as the rear bearing just described.

Figure 8:
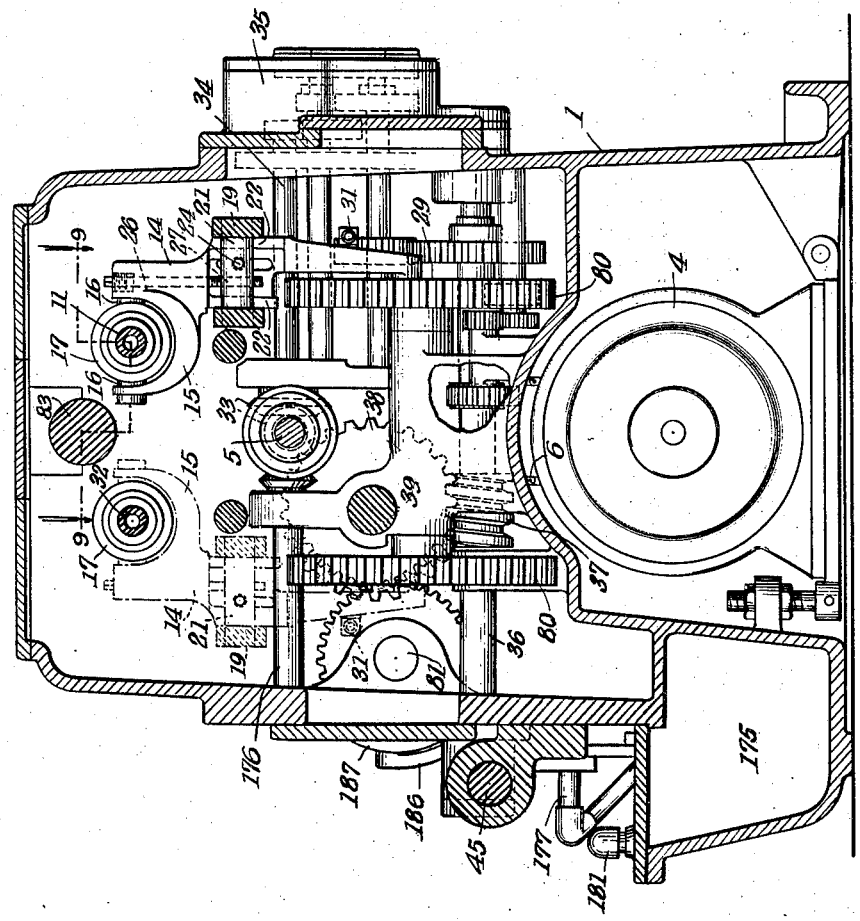
Fig. 8 is a sectional view taken substantially in the plane of the line 8—8 of Fig. 3.
Figure 9:
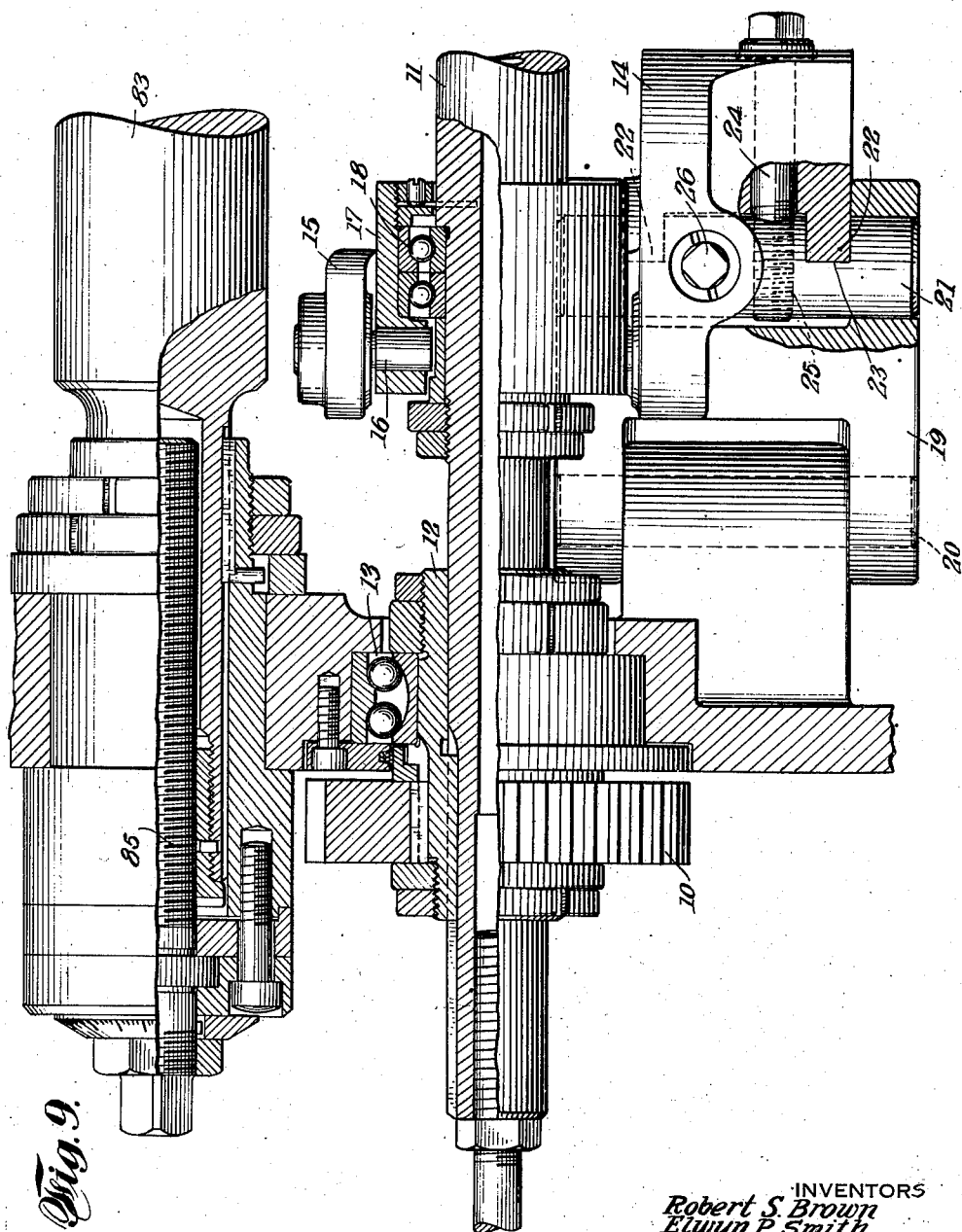
Fig. 9 is an enlarged fragmentary detail view taken substantially in the plane of the line 9—9 of Fig. 8.

The shift lever 14 shown more particularly in Figs. 8 and 9, and shown in dot-dash lines in Fig. 3, may comprise a yoke 15 having gudgeons 16—16 fitted into suitable bearing openings in the shift collar 17 carried upon an anti-friction bearing 18 on the spindle 11. The bearing shown is designed to take both radial and thrust loads so that the force for feeding the spindle transmitted through the shift lever 14 is taken by the bearing itself. In effect, the shift lever 14, through the gudgeons 16, is hung or suspended directly from the spindle itself. The shift lever 14 is fulcrumed on a shackle or link mechanism 19 pivotally mounted at 20 on the frame of the machine and secured at the opposite end to a fulcrum pin or block 21. The shift lever 14 is provided with slideways 22—22 and the fulcrum pin 21 is recessed so as to fit said slideways as indicated at 23. The fulcrum pin 21 is rigidly held in engagement with the slideways 22 by means of a bolt 24 passing through the shift lever 14 and threaded into the pin 21 as indicated at 25. The fulcrum pin 21 is held in the desired adjusted position lengthwise of the lever 14 by means of an adjusting bolt 26 passing lengthwise through the upper part of the lever 14 and threaded into the fulcrum pin 21 at 27. Therefore, when it is desired to change the fulcrum point of the shift lever 14, the securing bolt 24 is loosened so as to free the fulcrum pin from the slideways 22, after which the adjusting bolt 26 may be turned to move the fulcrum pin up or down to the desired adjusted position, after which it is held in such adjusted position by again taking up on the securing bolt 24. The lower end of the lever 14 is provided with a cam roll 28 to be engaged by a suitable face cam 29, as shown more particularly in Figs. 3 and 22. If desired, a draw back cam 30 may be employed for retracting the spindle. Means such as a compression spring 31 is preferably employed for constantly urging the shift lever 14 in a direction to retract the spindle and it will be clear that, since the shift lever is hung from the spindle itself and oscillates about the fulcrum pin 21, the spindle will always be retracted to the maximum extent permitted by the feed cam 29 or other stop for the spindle and the spindle overhang is reduced to a minimum. By means of the adjustable fulcrum lever various spindle feeds may be effected with any one cam. It will be apparent that the lever as shown in Fig. 3 in retracted position may be varied as to stroke by shifting the link 19 with but little change in spindle position, as the path of the fulcrum pin 21 is tangent to the arc of link 19 when spindle is so retracted. Also that cams of different rise may be substituted for cam 29 without change in the return cam 30, which will always compel retraction of spindle if spring means 31 should fail.

A threading spindle 32 (in this case the rear spindle) is mounted in suitable bearings in the frame and in order to provide for an interchangeable threading and machining spindle the spindle bearing arrangement may be the same or similar to that heretofore described in connection with the front spindle 11, though when the spindle 32 is arranged for threading its drive gear would be removed or disconnected from any drive from the motor. Improved means for rotating the threading spindle and providing for extreme accuracy in thread cutting is shown in Figs. 3, 5 and 6.

The threading spindle drive originates in the main drive shaft 5 and through bevel gears 33 power is transmitted to shaft 34 (Fig. 8). Then, through suitable gearing, including change gearing in housing 35 (see also Fig. 22), power is finally transmitted to the worm shaft 36 carrying the worm 37 meshing with worm gear 38. It is to be understood that a main feed clutch is interposed between the main drive shaft 5 and the ultimate threading spindle drive, index drive, and other drives having to do with the feed works. Such clutch is controlled by the usual feed clutch lever as will be readily understood. From worm gear 38 power is transmitted through shaft 39 to a spur gear 40 meshing with a spur gear 41 on shaft 42. Shaft 42 carries a variable speed gear, such as an elliptical gear 43, which in turn meshes with and drives a corresponding elliptical gear 44 on shaft 45. Carried integrally with elliptical gear 44 on shaft 45 is a crank disk 46 which adjustably carries a crank pin 47 for driving a connecting rod type of rack 48. The length of the crank may be varied by the adjusting screw mechanism 49 as clearly shown in Fig. 5.

Rack 48 engages and drives a pinion 50 loosely mounted upon a shaft 51 carried in suitable bearings in the frame and in removable cover plate 52. Thus, when the crank is rotated so as to reciprocate the rack, the pinion 50 is rotated in forward and reverse directions. The rotation of the pinion 50 is multiplied by suitable means so as to multiply the rotation of the threading spindle ultimately driven by the mechanism just described. The multiplying means employed in the preferred form comprises a generally planetary type of transmission shown especially in Figs. 5 and 6. The pinion 50 carries a spider 53 and cluster gears 54—54. The gears 54 mesh with an internal gear 55, fixedly carried in a frame bearing boss 56. Within the cluster of gears 54 and meshing therewith is a pinion 57 on shaft 51. Shaft 51 at its right hand end as viewed in Fig. 6 carries a threading spindle drive gear 58 which in turn meshes with a pinion 59 carried by and driving the threading spindle. The pinion 57 is slidable endwise towards the left from the position shown in Fig. 6 so that when the securing nut for the gear 58 is removed the shaft 51 or the pinion 57 carrying the gear 58 may be moved toward the left so as to strip the gear 58 from its drive and permit its edgewise removal so that the gears 58—59 may be removed and other change gears substituted.

It will be seen, therefore, that the rotation of the rack pinion 50 may be multiplied to the desired extent by the planetary type of transmission and change gears 58—59. Furthermore, without the employment of change gears, the rotation of the pinion 50 may be increased or decreased by varying the length of the crank arm, as heretofore described.

If the crank were driven directly by spur gears there would be the well known harmonic motion transmitted to the rack. However, it is desirable to provide a substantially constant running on speed and a considerably accelerated running off speed of the threading tool. By the employment of the elliptical gear drive for the rack crank the running on speed may be made substantially constant and the running off speed may be greatly accelerated, and during such motion the running on time is, of course, much longer than the running off time, as it should be.

With the parts arranged as shown for example in Fig. 5 the threading spindle 32 will be rotated in one direction for cutting threads of one hand. In order to cut threads of the opposite hand the rack 48 may be removed from the crank pin 47, turned over axially 180°, and engaged with the opposite side of the pinion 50, and the rack holding strap 60 may be swung around to hold the rack on the opposite side of the pinion from that shown. By so reversing the position of the rack relatively to the pinion 50 threads of the opposite hand may be readily cut and the running off time will be less than the running on time, as heretofore described. It is furthermore to be noted that, regardless of the length of the crank arm, which determines the number of rotations of the pinion 50, the ratio of the running on time to the running off time will be precisely the same. Instead of reversing the rack to cut threads of the other hand, it will be clear that the same result may be accomplished by simply reversing the position of the crank pin on the crank, that is, by loosening the holding gib and reversing the dovetail slide (Figs. 3 and 6) carrying the crank pin 47 so as to position the crank pin 180° from its present position.

If it is desired to employ both the spindle 32 and the spindle 11 as threading spindles, a connecting gear 61 may be interposed between the spindle drive gears 59 and 10, as shown more particularly in Fig. 7. Thus both spindles may be rotated by the rack and pinion mechanism described and in the same direction but not necessarily at same speed or making the same number of turns, for by employing different sized driven gears on spindle 11 from that on 32 as shown in Fig. 7, where gear 59 is smaller than gear 10, the latter will make fewer turns and hence at slower speed. If reverse directions of the two spindles are desired, for example when cutting threads of opposite hand by the two spindles, an idler may be interposed in the train shown in Fig. 7, and in any event if the two spindles are driven by the rack and pinion mechanism, the ratio of the running off to the running on time is always the same, regardless of the hand of the thread being cut or the number of turns of either spindle.

It may be noted at this point that if it is desired to employ both spindles as machining spindles instead of a threading spindle or as one threading spindle and one machining spindle, the two spindles may be geared together and driven by the gear train heretofore described in connection with the driving of the spindle 11 or a separate train of gearing may be employed all starting from the drive shaft 5. It may also here be noted that the spindle shift lever 14 may be left in place whether or not either or both spindles are employed for machining. Of course, if the spindles are arranged for threading, the shift levers in most cases would be rendered inoperative by the removal of at least the feed cam, as 29.

In order to feed the threading spindle, it is in many cases desirable to use a thread leader and desirable also to jump the threading tool to the work and away from the work when disengaged therefrom. As shown particularly in Figs. 3 and 5, we have provided thread leader mechanism and improved means for jumping the threading spindles or both threading spindles when both are arranged for threading into and from the work. In the form shown, the frame is provided with a base 65 having slideways 66 thereon. On the slideway in the rear of the threading spindle is a thread leader slide 67 which carries one thread leader member, as a leader nut 68, while the opposite thread leader member, as the lead screw 69, is carried by the end of the threading spindle. These thread leader members preferably remain always in threaded engagement with each other. In order to jump the threading tool into and from the work, the slide 67 is arranged to be slid along the slideway and securely held in its forward jumped position. In the form shown are improved means for jumping the slide 67, which comprises a toggle 70 fixed to the frame at 71 and fixed to the movable slide at its opposite end at 72. The toggle is operated by means of a link 73 and a lever 74. There is preferably an adjustable lost motion connection between the link 73 and lever 74 so that there may be considerable motion of the lever without affecting the link and toggle for such times as it is desired to provide for only a slight jump. The lever 74 is actuated by a link 75 and bell crank lever 76 which is itself rocked by means of a suitable cam 77 mounted upon the shaft 39 or other shaft operating in synchronism with the shaft 45 which drives the rack. When the bell crank is moved so as to break the toggle, it will be clear that through the thread leader mechanism the slide and threading spindle will be retracted, and conversely, when the toggle is straightened out, the threading spindle will be jumped to threading position. The parts are preferably proportioned so that when the toggle is straightened out the threading spindle will be in its desired forwardly jumped position, so that the thread leader nut and slide 67 will be securely held and with the least strain on the various parts of the toggle mechanism. If the amount of lost motion in connection with link 73 and lever 74 is such that the toggle is unmoved from straightened position as when no jump is required on tap before entering work, the spindle is then wholly controlled by the leader screw 69 on same, working in a then stationary leader nut 68.

The cam or cams which are employed for feeding the spindle or spindles when both are arranged for machining, and not for threading, are driven in synchronism with the index mechanism, as is usual in machines of this type. The drive for the cam or cams for the machining spindle or spindles is taken from the shaft 5 through shaft 34 and through various change gears in the housing 35, and ultimately is to the drive gears 80—80 which carry cams, as 29, for actuating the gear shift levers.

The main cam or index shaft 81 is preferably driven through suitable spur gears carried on the worm wheel shaft 39 and index shaft, which latter extends along the rear to the turret end of the machine and which drives the index and other parts at that end of the machine.

The turret preferably comprises a generally disk shaped member 82, rigidly mounted on a bar or stem, the projecting portions of which will be referred to as a forward turret bar or stem 83 (see also Fig. 9) and a rearwardly extending bar or stem 84, both said stems being mounted in suitable bearings in the frame. The forward bar or stem is adjustably held in a bearing in the spindle end of the frame and may be adjusted by means of the adjusting screw 85, as shown particularly in Fig. 9. Thus, all of the tool thrusts on the turret are taken on the spindle end of the frame where, through the spindles, they originate.

The turret is locked and clamped in indexed positions by means substantially like that shown in Brown-Montstream Patent, No. 1,704,032, March 5, 1929. A split turret housing 95 surrounds the turret and is carried upon a rigid bar 96 slidably mounted in suitable bearings in the frame. The turret housing carries a clamping lever 97 pivotally mounted thereon at 98 and which at the lower end has a roll 99 for engagement by a long cam 100 carried on the index shaft 81. An adjustable draw rod 101 is threaded into or otherwise adjustably secured to the lever 97 and at the other end engages one side of the turret clamp or housing so that when the lever 97 is moved in one direction by the cam 100, the turret housing is unclamped and is aided in freeing the turret by the spring 102. When the lever 97 is in the position illustrated and not moved counterclockwise into clamping position, the spring 103 acting between a fixed frame abutment 104 and a nut 105 on pin 106 serves to draw down on the draw rod 101 for rigidly clamping the turret housing about the turret. The turret is provided with locking slots, which in the present case are three in number since there are three indexed positions of the turret. A locking bolt 107 carried by the turret housing is arranged to fit in the locking slots for positioning the turret in indexed position. The locking bolt 107 is actuated by a bell crank lever 108 pivoted to the turret housing at 109 and actuated by a cam 110 on the index shaft. The locking bolt may be urged inwardly by means of a spring (not shown) and as illustrated is moved to outwardly or unlocking position positively by means of the cam 110. The cams are, of course, synchronized so as to act in properly timed relation to indexing of the turret and other functions of the machine and the cams are of such length that they may act on the levers in all axially adjusted positions of the turret.

A Geneva motion is highly desirable as an indexing means for a turret, but when there are relatively few indexed positions for the turret, such as three in the present case, generally speaking an ordinary Geneva motion is not suitable because of the very high index speed of the turret at the mid-portion of its index. A three-slot Geneva motion requires a 60-degree movement of the index arm to move the slotted member 120 degrees (1 station), and the slotted member attains a maximum velocity at its periphery of 6.4 times that of the index arm, due to the fact that the index roll passes so close to the center of the index disk. We have devised improved means whereby a Geneva motion may be employed for indexing and in which the index roll or pin approaches and leaves the slotted index wheel in truly radial direction and at the same time the speed of index at the mid-portion is reduced to a reasonable value.

In the one specific form to be described we provide means for varying the speed and varying the effective length of the index arm and have simultaneously the minimum speed and minimum effective length of arm. By periodically varying the length of the arm, making it shortest at the time of its closest approach to the center of the slotted member and slowing the speed of the arm by the use of eccentrically mounted gears somewhat after the manner disclosed in Brown Patent No. 1,833,122, the time of index may be spread over 135 degrees of cam shaft rotation and the maximum peripheral speed of the slotted member will be only about 1.5 times the speed of an arm if mounted directly on the cam shaft. The above action may be accomplished without sacrificing the truly radial engagement and disengagement of the roll with the slots of the index disk.

In the particular embodiment shown (Figs. 2, 4, 10, 11) the turret or any suitable extension thereof, as the bar 84, carries a Geneva wheel or plate 115, provided with three equidistant slots 116—116. The roll 117 for engagement with the slots for indexing the turret is a roll of relatively great length, that is to say, it is of sufficient length to permit engagement with the slots of the disk 115 during all axially adjusted positions of the turret. The index roll 117 is rotatably carried by and between a pair of arms 118—118 and the disk 115 is positioned between those arms. The arms 118 are carried by a bearing hub or boss 119 which, in the form shown, is itself carried by movable pivot means in the form of an eccentric bearing member 120. The bearing member 120 is an eccentric, being mounted upon journals 121—121 at opposite sides, which journals are mounted in suitable frame bearings. For a purpose to be later described the eccentric bearing 120 is rotated at twice the speed of the index arms 118 and in the opposite direction by means of drive gear 122 and pinion 123 with interposed idler 122'.

The boss 119, and with it the arms 118 and index roll 117 are rotated by the index shaft 81 and with a variable motion. In the form shown, we employ an elliptical gear 124 on the index shaft 81 and a meshing elliptical gear 125 movable with the boss 119. As illustrated, the gear 125 is provided with a radial slot 126, and the boss 119 is provided with a slide 127 engageable in the slot 126, so that when elliptical gear 125 is rotated, the boss is carried around with it. The elliptical gears are so meshed and the eccentric 120 is so placed that during rotation of the elliptical gears and eccentric (in the opposite direction), the index roll 117 is positioned so as to engage in the slot 116 in a truly radial direction characteristic of a true Geneva motion. During the further rotation of the boss 119 and index roll 117, the eccentric 120, rotating at twice the speed of the index shaft 81, moves the pivot point of the boss 119 away from the turret axis so that when the index roll 117 would normally be nearest the center of the turret axis, the eccentric will have pulled the roll 117 downwardly to its maximum extent, as indicated in Fig. 11, and the speed of the turret at mid-index will be reasonable. As the eccentric continues to rotate at a faster rate than the index shaft, the roll 117 will again be moved outwardly so that as it leaves the slot 116 at the end of the indexing movement, the recession of the roll from the slot will be in a truly radial direction. In Fig. 11, the dot-dash line indicates the path of movement of the roll 117 under the influence of the elliptical gears shown and the eccentric mounting for the index arms and roll. By the means disclosed, we obtain all of the advantages of a Geneva index motion, that is, normal approach and leaving of the slot by the index roll and the smooth action during indexing and at the same time reduce the speed of indexing at mid-index to a reasonable value.

We have provided improved fluid pressure chucking mechanism which may employ either a liquid or gas as the motive fluid. The form and arrangement are such as to materially shorten and lighten the chucking mechanism whereby the indexible mass is substantially lighter than similar devices with which we are familiar. Other features to facilitate various changes in chucking arrangement, inspection, and repair, etc., have been provided. In the turret illustrated, we employ three chucks 130 which may be of the general form disclosed in Brown Patent No. 1,969,687, August 7, 1934. It is to be understood that various features of the chucking mechanism may be employed with chucks of various types.

The chucks illustrated (Fig. 4) comprise jaws 131—131 which are moved by means of a right and left hand screw 132, as will be understood. The screw 132 may be actuated by elliptical gears 133—133, as more fully set forth in said Brown patent. Each chuck is provided with an individual chucking cylinder 134 (Figs. 4, 15), each preferably made separate from the other so that inspection and repair will be facilitated. In each cylinder 134 is a piston 135 having a piston rod 136. The piston rod projects through the tail end cylinder head 137 and need not be in fluid-tight engagement therewith. A rack 138 is formed on the piston rod and extends as close as necessary to the piston as illustrated more particularly in Fig. 15. The cylinder head at the tail end comprises a housing for the rack and a bearing for the shaft 149 carrying a pinion 140 meshing with and driven by the rack 138 and secured to and driving one of the gears 133. The cylinder head 137, as stated, completely houses the end of the rack and the pinion 140 and a part of the shaft 139 so that all of those parts are actually in fluid communication with the tail end of the cylinder. Where the shaft 139 emerges from the cylinder head housing, we provide a stuffing-box 141, the only stuffing-box required for each cylinder unit, and such stuffing-box, as will be noted, surrounds a rotating shaft and not a reciprocating piston rod. It will be seen that when the piston and rack reciprocate, the pinion 140 will be rotated and the chuck jaws 131 moved to open and closed positions. It will be clear that by providing the rack directly on the piston rod and permitting the same to pass into the cylinder when the piston is at the head end of its stroke, the entire assembly is very much shortened, that is, it is shortened by the length of one piston stroke and stuffing-box usually employed about the piston rod. Furthermore, the single stuffing-box 141 surrounding a rotating shaft may be much more readily kept tight and is subject to very much less wear than is the ordinary stuffing-box surrounding a reciprocating rod.

The pistons are reciprocated, as stated, by pressure fluid, and we have devised improvements in the fluid distributing system. The rear turret stem 84, in the form shown (Figs. 16, 17), is centrally drilled to provide a bore 145 therein, and the end of the bore may be counterbored to provide a smaller bore or passage 146 extending to a point about opposite the tail end of each cylinder 134. Threaded into the counterbore is a fluid conduit 147 which is spaced from the bore 145. Thus, two concentric conduits 145—147 are provided within the rear turret stem 84. As indicated, the cylinders may be mounted upon a suitable turret extension and fluid connection is made to each cylinder valve from the conduit 146—147 by means of a pipe connection or passage 148, and a second connection 149 is made from the outer concentric passage 145 to each cylinder. The passage 148 opens into a part of the cylinder valve casting, as indicated at 150, and the passage 149 opens into the same casting at the point 151. Spaced from the opening 150 is an opening 152 leading to the tail end of the cylinder 134 and spaced from the opening 151 is an opening and passage 153 leading to the head end of each cylinder. A simple form of cup valve 154 extends over the passages 150, 151, 152, and 153, and is actuated by a handle 155 either manually or automatically, e. g., as disclosed in Brown Patent No. 1,833,822, November 24, 1931. The valve 154 is provided with a connecting passage 156, which, in the position shown in Fig. 16, connects the passage ports 150—152 and is provided with a second connecting passage 157, which, in the position illustrated in Fig. 16, connects the passage ports 151—153. Thus, if we assume pressure fluid as entering through the inner conduit 147, such pressure fluid would be conducted through counterbore 146, connection 148, port 150, passage 156, port and passage 152 to the tail end of the cylinder so that the piston would be driven to the right as illustrated in Fig. 15. While the piston 135 is moving toward the head end, pressure fluid from the head end may escape from such head end through passage 153, connecting passage 157, passage 151, connection 149, to the outer concentric bore 145 in the turret bar. When the valve 154 is shifted about 90° from the position shown in Figs. 15 and 16 in a clockwise direction, the various passages will be reversed, as will be clear, and pressure fluid will then pass through the pressure pipes 147 to the head end of the cylinder and pressure fluid from the tail end of the cylinder will escape through exhaust pipe 145, all as will be readily understood.

Figure 2:
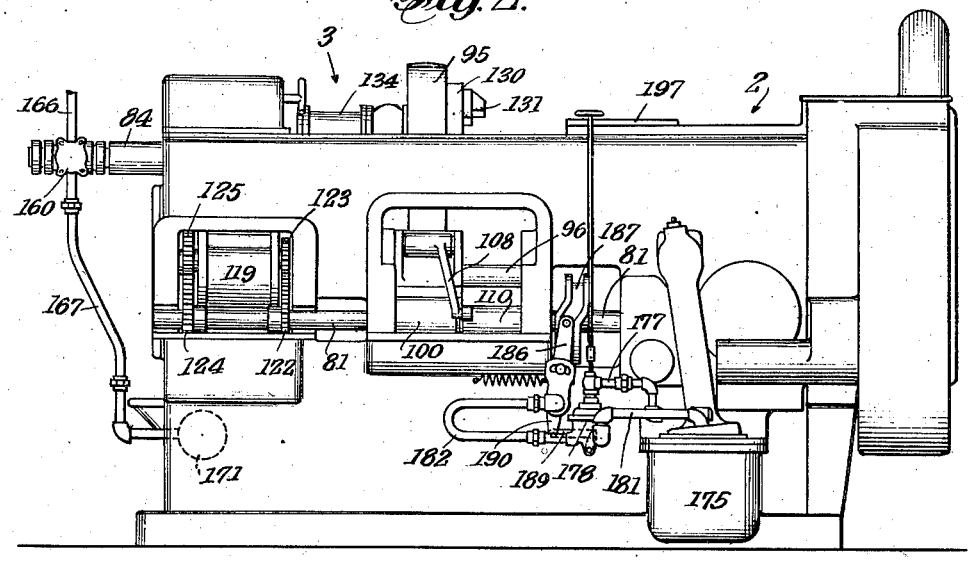
Fig. 2 is a rear view in elevation of the machine shown in Fig. 1.
Figure 4:
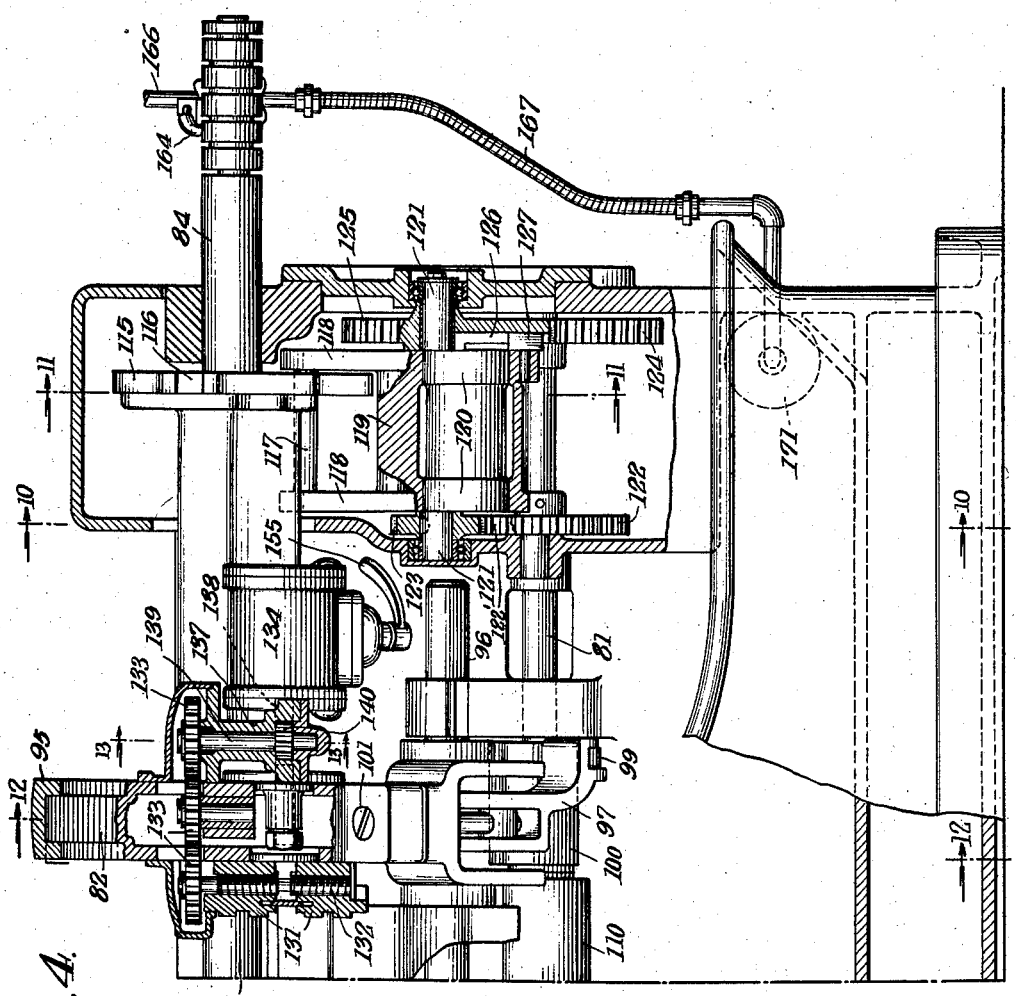
Fig. 4 is a view similar to Fig. 3 but showing the right hand end of the machine shown in Fig. 1.

In order to provide for chucking work pieces either on the outside or inside thereof, we have devised simple means for reversing the flow of fluid through conduits 145, 147. In the form illustrated (Figs. 17, 18, 19), we have provided a reverse valve body 160 between parts of which is positioned a movable reversing valve disk 161. From the body 160 a conduit 162 leads to a ring member 163 extending about the turret bar 84 or a suitable extension thereof and communicates through a suitable passage with the inner concentric conduit or pipe 147. The ring 163 is packed so as to make a tight joint between the non-rotatable ring and the indexing bar 84. A second pipe connection 164 connects a port in the reverse valve body with a ring 165 communicating with the outer concentric bore or passage 145 in the stem. A pressure inlet pipe 166 communicates with the body 160 and an exhaust pipe 167 also communicates therewith. The reversing valve disk 161 is provided with connecting ports 168—169. With the valve turned to the position shown in Fig. 19, as by means of the small manual handle 170, pressure fluid entering through inlet pipe 166 is conducted through passage 169 to pipe 162, which, as heretofore stated, communicates with the inner conduit 147 in the turret bar 84. With the valve in the same position, the outer conduit 145 in the turret bar 84 communicates through pipe 164 and passage 168 with the exhaust pipe 167, which, when air is the motive fluid employed, may extend to a suitable muffler or silencer, as indicated at 171 (Fig. 2). When oil is employed as the motive fluid the exhaust pipe 167 is arranged to conduct the oil back to the sump.

It is often desirable to reverse the action of the chucking pistons for actuating the chucks so as to make it possible to grip work either by the inside or the outside. The simplest method of accomplishing such action is to reverse the pressure connections to the various cylinders, and it is for that reason that we have provided the reverse valve mechanism illustrated in Figs. 17, 18 and 19. When the reverse valve 161 is turned by means of the handle 170 through about 90° in a clockwise direction, it will be clear that the passages 164 and 166 will be connected to each other, and the passages 162 and 167 will be connected to each other, and therefore pressure fluid would now pass into the outer conduit 145 in the turret bar, and inner conduit 147 would then become the exhaust conduit. Then, upon actuation of the piston valve by means of the handle 155, the piston will be operated just the reverse of its operation previously described. Therefore, upon movement of the chucking handle 155, work may be chucked on the outside and upon the same movement of the handle 155 after shifting the reverse valve 161, work may be chucked on the inside.

Since the reverse valve 160 and pipes connected thereto do not rotate, and since the turret bar 84 does rotate, we may employ means such as a U strap 174, which may be secured to a fixed part of the frame and thus hold the reverse valve parts from rotating, and yet will permit adjustment of the reverse valve parts with the turret, the reverse valve parts sliding between the legs of the U-shaped strap 174.

We have devised means for intermittently directing coolant onto the work in work stations and at the same time substantially completely enhousing such work so as to prevent the coolant from spattering.

In the preferred form illustrated (Figs. 2, 8, 10, 20, 21), we provide a coolant pump (not shown) in the reservoir 175 which pump may be driven from a shaft 176 (Fig. 8), taking its power from the main drive shaft 5, through bevel gears and a shaft extending down into the coolant reservoir or sump 175. The pump discharges through pipe 177 into a diversion valve casing 178 (Fig. 20) provided with a pair of valves 179—180. Connected to the diversion valve casing is a return pipe 181 controlled by valve 180 and which returns excess coolant to the sump 175; and a coolant pipe 182 controlled by valve 179 and which leads to a pipe 183 journalled in the frame and carrying a U pipe 184 provided with coolant discharge nozzles or the like 185—185. The pipe 183 acts as a journal for the U pipe 184, and on the pipe 183 is a lever 186 which is actuable by a cam 187 on the index shaft 81. Thus, with the cam 187 properly formed and set, the coolant pipe 185 is rocked up to the chucks in position to discharge coolant onto the work carried thereby at about the time the tools and work come together, and the coolant pipe 184 is moved back away from the work when the tools are retracted and before indexing.

In order to stop the flow of coolant when the tools have been retracted, the diversion valve 178 is employed. Beneath the valve is a rocker 188 on a shaft which is actuated by a link 189 attached to the lower end 190 of lever 186 and a lever on said shaft (Fig. 2). Thus, when the coolant pipe 184 is rocked toward the chucks into position to discharge coolant onto the work, the link 189 will have actuated the rocker 188 so as to lift the valve 179 as by means of the pin 191 and permit the flow of coolant from the pump discharge pipe 177 to the pipe 183—184 and nozzles 185. As soon as the coolant pipe 184 is rocked back away from the chucks, the same link 189 serves to rock the rocker 188 and permit the valve 179 to close and at the same time open the valve 180 so that the fluid from the pump discharge pipe 177 is simply by-passed back into sump through pipe 181. It will thus be seen that coolant is automatically discharged onto the work and the coolant supply cut off, in timed relation with the indexing and tooling operations.

In order to prevent spattering of coolant, the machine is provided with such conventional fixed splash guards as may be conveniently employed, for example, the guard 195 in Fig. 21. A movable splash housing 196 (Figs. 1, 3, 21, 22) is provided between the turret and the spindle end of the machine, which housing, if desired, may be formed in two parts, one extending down quite closely over the front turret bar 83 and down over the work, and an outer housing portion 197 extending over a part of the top of the spindle end of the frame so as to close the space between the spindle end of the frame and the turret when the housing members are advanced. In the preferred form, the housings are actuated by and with the coolant U pipe 184. The housing member 196 may be provided with U straps 198—198 which straddle the pipe 184, and the housing members are therefore constrained to move with the coolant pipe 184. The housing member 196 is preferably shaped so as to leave the upper chuck, that is, the chuck in loading position, uncovered so that that chuck may be loaded while the work in the other two chucks is substantially completely housed during the times that the work and tools are in engagement with each other. As soon as the tools have finished their operations, the coolant pipe and housings are withdrawn and the turret may then index freely without danger of contact between the work pieces and the movable housing 196. As soon as the turret has been again indexed to bring a finished work piece to the upper or loading station, the housings are again advanced to their housing position and the coolant supply turned on. Thus, the chuck in loading station may always be out in the open where it can be loaded during such time as work pieces in the work stations are being operated upon by tools; and during such time that tooling operations are taking place, the work in work stations is completely housed and coolant thrown off by the rotating tools will be confined within the frame and housings. Flying chips will also be confined by the housings within the frame.

While the invention has been described in considerable detail and a preferred form illustrated as embodied in one particular type of machine, it is to be understood that various features may be used in connection with machines of other types and that various parts may be used independently of others described herein. Various changes, modifications, additions, and omissions may be made within the scope of the invention as defined in the appended claims.

We claim:
1. In a machine of the character indicated, a threading spindle, a rack and pinion for rotating the latter in forward and reverse directions, crank means for reciprocating said rack, and means for modifying the motion imparted to said rack by said crank means and comprising eccentrically mounted gears.

2. In a machine of the character indicated, a threading spindle, a rack and pinion for rotating said spindle in forward and reverse directions, a crank for reciprocating said rack, means for adjusting the length of said crank, means for modifying the motion imparted to said rack by said crank, said means including means for maintaining the same ratio of the running off to the running on times of said threading spindle regardless of the length of said crank.

3. In a machine of the character indicated, a threading spindle, means including a pinion for rotating the same, a reciprocable rack for driving said pinion, and means for holding said rack and pinion in engagement with each other with said rack on either side of said pinion, for the purpose described.

4. In a machine of the character indicated, a threading spindle, a pinion for driving the spindle, a rack for driving said pinion, speed multiplying means between said pinion and said threading spindle, an adjustable crank for actuating said rack, thread leader mechanism, and means for automatically jumping said spindle into working position.

5. In a machine of the character indicated, a threading spindle, means for rotating the same, thread leader mechanism for said spindle, and means for jumping said spindle into working position comprising a toggle mechanism and means for actuating said toggle mechanism.

6. In a machine of the character indicated, a threading spindle, rack and pinion means for driving said spindle in forward and reverse directions, a crank for reciprocating said rack, and means including eccentrically mounted gears for driving said rack and modifying the normal harmonic motion imparted to said rack by said crank, to produce a substantially uniform movement of said rack when rotating said threading spindle in threading on direction.

7. In a machine of the character indicated, a threading spindle, a thread leader member for said spindle, a coacting thread leader member, means for rotating said spindle in forward and reverse directions comprising a rack and pinion, means for jumping said spindle into working position, and means for reciprocating said rack.

8. In a machine of the character indicated, a rotatable spindle, a shift lever for the same, means for suspending said shift lever from said spindle, a pivotally mounted fulcrum link, an adjustable fulcrum for said shift lever on said fulcrum link, cam means for actuating said shift lever to feed said spindle, and means independent of said cam means for withdrawing said spindle to the same extent after each feeding movement thereof.

9. In a machine of the character indicated, a rotatable spindle, a shift lever therefor, a movable fulcrum link, an adjustable fulcrum for said shift lever on said link, cam means for actuating said shift lever to feed said spindle, and means independent of said cam means for always withdrawing said spindle to the same extent after each feeding movement thereof.

10. In a machine of the character indicated, a rotatable spindle, a shift lever for feeding the same, a pivotally mounted fulcrum link, a fulcrum for said shift lever on said link, and means carried by said shift lever for adjusting said fulcrum to vary the lever arms of said shift lever, for the purpose described.

11. In a machine of the character indicated, a turret, means for indexing the same comprising a slotted disk, a long pin to engage the slots of said disk, means for supporting said pin on opposite sides of said disk, and means for rotating said pin about an axis parallel to the axis of indexing of said turret.

12. In a machine of the character indicated, an indexible slotted member, an index arm having means to engage said slotted member, means for pivotally mounting said arm and shifting the pivot point of said arm toward and away from the axis of said slotted member, and means for rotating said arm about said shifting axis with a variable motion.

13. In a machine of the character indicated, an indexible slotted member, an index arm having means for engagement with said slotted member, means for rotatably moving said arm with a variable speed during engagement between said slotted member and the means on said index arm, and means for shifting the axis of said arm toward and away from the axis of said turret.

14. In a machine of the character indicated, an indexible member having three slots equi-distant from each other, an index arm having a member to sequentially engage said slots for indexing said indexible member, means for rotating said arm with a variable speed during indexing, and means for moving the axis of rotation of said arm away from the axis of said indexible member during indexing.

15. In a machine of the character indicated, an indexible member, means for indexing the same comprising a rotatable index arm, means for mounting said index arm upon an eccentric, means for rotating said eccentric to separate the axis of rotation of said indexible member and arm during indexing, and means for rotating said arm.

16. In a machine of the character indicated, an indexible member, indexing means therefor including an index arm to coact therewith, eccentrically mounted gears for rotating said index arm to modify the motion imparted to said indexible member by said rotating index arm, and means for moving the axis of rotation of said arm away from and toward the axis of said indexible member during indexing thereof.

17. In a machine of the character indicated, an indexible member having slots therein, a rotatable index arm having a member to engage within said slots for indexing said turret, means for moving said member on said index arm during rotation of the latter away from and toward the axis of said indexible member, and means for rotating said arm at variable speed during indexing.

18. In a machine of the character indicated, an indexible member having slots therein, an index arm having a member to serially engage said slots for indexing said indexible member, means for rotating said arm with a variable motion, and means for varying the effective length of said arm during indexing, said parts being arranged to cause said arm to move at its slowest rate at substantially the time that its effective length is the shortest.

19. In a machine of the character indicated, a turret, means for adjusting the same axially, means for indexing said turret comprising, an index plate, an index pin to coact therewith for indexing said turret, means for supporting said pin comprising means at opposite sides of said index plate and spaced apart a greater distance than the adjusting range of said turret whereby said turret may be indexed by the same means in all positions of axial adjustment.

20. In a machine of the character indicated, an index plate, an index pin to coact therewith, an index arm carrying said pin, means for rotating said arm with a variable motion, an eccentric for mounting said arm, and means for rotating said eccentric at twice the speed of said arm and in the reverse direction, for the purpose described.

21. In a machine of the character indicated, a turret, a chuck carried thereby, means for actuating said chuck comprising a fluid actuated piston and cylinder, a piston rod secured to said piston and having rack teeth thereon extending into said cylinder when said piston is at one end of its stroke, a pinion engageable by said rack for rotation of said pinion, a pinion shaft, a stuffing-box about said pinion shaft, and means actuated by said pinion shaft for actuating said chuck.

22. In a machine of the character indicated, a chuck, a cylinder mounted closely adjacent thereto, a piston in said cylinder, a piston rod extending from said cylinder, rack teeth on said piston rod and extending into said cylinder when said piston is at one end of its stroke, a pinion in engagement with said rack, a pinion shaft for said pinion, a stuffing-box extending about said pinion shaft, the interior of said cylinder and the space about said piston rod having rack teeth and about said pinion and pinion shaft being all in pressure communication with each other, and means actuated by said pinion shaft for actuating said chuck.

23. In a machine of the character indicated, an indexible chuck carrier, a plurality of chucks carried thereby, a fluid pressure actuating device for each of said chucks, common means for conducting pressure fluid to all of said chucks, common means for conducting pressure fluid from all of said chucks, and means for causing a reversal of flow of fluid through said common means.

24. In a machine of the character indicated, a chuck carrier, a plurality of chucks carried thereby, a fluid pressure actuating device for each of said chucks, a pressure inlet duct for conducting pressure fluid to all of said chucks, an exhaust duct for conducting pressure fluid from all of said chucks, and means for directing pressure fluid into said exhaust duct, and connecting said pressure fluid duct to exhaust.

25. In a machine of the character indicated, a chuck carrier, a plurality of chucks carried thereby, a fluid pressure actuated device for actuating each of said chucks, a fluid pressure inlet duct leading to said chucks, a fluid pressure outlet duct leading from said chucks, a pressure pipe for normally leading pressure fluid to said fluid pressure inlet duct, an exhaust pipe for normally leading pressure fluid from said exhaust duct, and shiftable means for connecting said pressure pipe to said exhaust duct and said inlet duct to said exhaust pipe, for the purpose described.

26. In a machine of the character indicated, a chuck carrier, a plurality of chucks carried thereby, a fluid pressure actuated device for each of said chucks, a separate valve for each of said fluid pressure actuated devices for controlling the actuation thereof, an axially extending pressure fluid inlet duct, an axially extending exhaust duct, a pressure pipe, an exhaust pipe, shiftable means for normally connecting said pressure pipe to said fluid pressure inlet duct and said exhaust duct to said exhaust pipe, said shiftable means being shiftable to connect said pressure pipe to said exhaust duct and said fluid pressure inlet duct to said exhaust pipe.

27. In a machine of the character indicated, a chuck carrier, a plurality of chucks carried thereby, means for indexing said chucks, a tool positioned to coact with each of said chucks serially upon indexing thereof, means for moving said tool and chuck relatively to each other, means for discharging coolant on the work carried by said chuck in work station, a shiftable hood member to confine coolant, and means for automatically shifting said hood in timed relation with the relative movement of said chuck and tool.

28. In a machine of the character indicated, a chuck carrier, a plurality of chucks carried thereby, means for indexing said chuck carrier to serially move said chucks from loading station into work station, a tool, means for moving said tool relatively to a chuck in work station, means for discharging coolant into the work in a chuck in work station, and automatic means for discharging coolant on the work in work station upon the advance of said tool and chuck in work station.

29. In a machine of the character indicated, a chuck carrier, a chuck carried thereby, a tool, means for feeding said tool and chuck relatively to each other, a shiftable hood for said tool and chuck, a shiftable coolant conductor, means for simultaneously shifting said hood and coolant conductor in timed relation with the advance of said tool and chuck, and simultaneously directing coolant from said coolant conductor onto the work carried by said chuck.

30. In a machine of the character indicated, a chuck, a tool, means for feeding the same relatively to each other, a coolant conductor, and means for starting the flow of coolant onto work carried by said chuck and acting in timed relation with the advance of said tool and chuck.

31. In a machine of the character indicated, a tool, a chuck, means for feeding the same relatively to each other, a splash hood, and means acting in timed relation with the feed of said chuck and tool for shifting said splash hood, for the purpose described.

32. In a machine of the character indicated, a chuck, a tool, means for feeding the same relatively to each other, a coolant conductor and splash hood movable simultaneously, means acting in timed relation with the feed of said tool and chuck for directing coolant on the work carried by said chuck and covering said work by said splash hood.

33. In a machine of the character indicated, a chuck, a tool, means for feeding the same relatively to each other, a coolant conducting means, valve means for controlling the discharge of coolant onto the work carried by said chuck, and means including said valve means and acting in timed relation with the feed of said tool and chuck for controlling the flow of coolant to the work.

34. In a machine of the character indicated, a chuck carrier, a plurality of chucks carried thereby and indexible from station to station, means to act on work carried by said chucks, a coolant discharge pipe and a splash hood movable simultaneously, valve means for controlling the flow of fluid in said coolant pipe, and means for moving said coolant pipe and hood into working position and initiating the flow of fluid through said coolant pipe.

35. In a chucking machine, an indexible chuck carrier, a plurality of chucks carried thereby and indexible from loading station to work station, a splash hood shaped to enhouse chucks in work station and leave each chuck when in loading station free, means acting in timed relation with the indexing of said carrier to move said hood back to permit indexing and to move said hood to enhousing position between indexes, and means for discharging coolant on work carried by a chuck in work station.

36. In a machine of the character indicated, a threading spindle, a pinion and toothed member meshing therewith for driving said spindle, means for oscillating said toothed member for driving said pinion in forward and reverse directions and including eccentrically mounted gears.

37. In a machine of the character indicated, a threading spindle, a gear and a toothed member meshing with said gear for driving said spindle, a crank for oscillating said toothed member to cause said gear to rotate in forward and reverse directions, and means including eccentrically mounted gears for driving said crank, for the purpose described.

38. In a machine of the character indicated, a threading spindle, a pinion for driving said spindle, a toothed member meshing with said pinion for driving the latter, a crank including a crank pin for oscillating said toothed member to drive said pinion in forward and reverse directions, and means for supporting said crank pin on said crank in selective positions on opposite sides of a plane in the axis of said crank, for the purpose described.

39. In a machine of the character indicated, a threading spindle, a pinion for driving said spindle, a toothed member meshing with said pinion for driving the latter, a crank including a crank pin for oscillating said toothed member to drive said pinion in forward and reverse directions, means for supporting said crank pin in selective positions on opposite sides of a plane in the axis of said crank for the purpose described, and means including eccentrically mounted gears for driving said crank, for the purpose described.

40. In a machine of the character indicated, a pinion, a toothed member meshing therewith and normally lying on one side of the axis thereof for driving said pinion, a crank including a crank pin member thereon for oscillating said toothed member to rotate said pinion in forward and reverse direction, and means for holding one of said members on either side of the axis of its coacting part, for the purpose described.

41. In a device of the character indicated, an index plate, an index arm having a roll to coact with slots of said plate, and means for driving said arm including means to vary the path of movement of said roll to cause it to enter and leave said slots in a direction normal to the axis of said index plate and to cause said roll to move away from the axis of indexing of said plate and move with diminished indexing speed at the center of the indexing movement of said plate.

ROBERT S. BROWN.
ELWYN P. SMITH.